March 12, 1946. J. T. HAYWARD ET AL 2,396,420
WELL SURVEY APPARATUS
Filed April 10, 1940 6 Sheets-Sheet 1

March 12, 1946.  J. T. HAYWARD ET AL  2,396,420

WELL SURVEY APPARATUS

Filed April 10, 1940  6 Sheets-Sheet 3

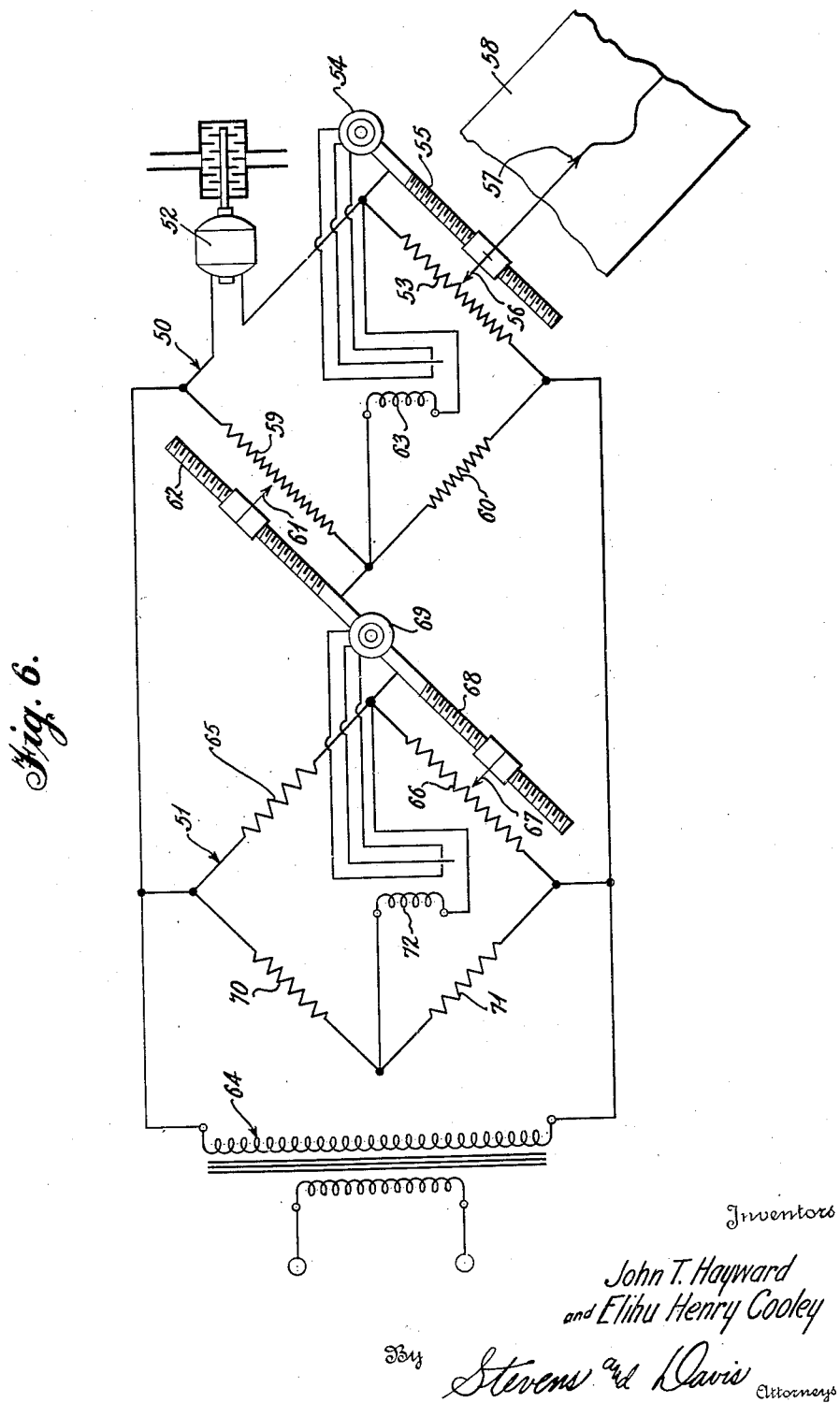

Patented Mar. 12, 1946

2,396,420

UNITED STATES PATENT OFFICE 2,396,420

WELL SURVEY APPARATUS

John T. Hayward and Elihu Henry Cooley, Tulsa, Okla.; said Cooley assignor to Engineering Laboratories, Incorporated, Tulsa, Okla., a corporation of Oklahoma Application April 10, 1940, Serial No. 328,982

4 Claims. (Cl. 234—1.5)

This invention relates to methods and apparatus for determining physical or chemical properties of substances without bringing the substances to standard conditions of temperature, pressure, or the like, and, in the course of the determinations, eliminating variations in the results due to the fact that the substance is not at standard conditions, so that the results may be directly compared with those of other determinations.

In particular, the present invention is concerned with a determination of such characteristics of fluids as their resistances and their viscosities. In making these determinations, it has been found extremely difficult to bring every sample to be examined to exactly the same temperature, and if this is not done, the results are not comparable except after time-consuming corrections, and this delays the comparison of results for such a length of time as to cause serious difficulties in field or industrial applications where it is often desired to use the comparisons of results immediately for the control of some operation that cannot readily be delayed to wait for data.

Further, where samples are taken for testing from several different stages of a process, it often becomes difficult to ascertain, without the same sort of detailed computation and correction, exactly what determinations should be compared in order to obtain the desired information. In other words, the materials at two spaced points in a continuous operation or process at any one time may have different characteristics which are not due to the operation or process but are due instead to a variation in the materials entering the operation or process.

In order to overcome these difficulties the present invention provides a method and means to automatically compensate for variations of the sample from standard conditions, and these variations may be in temperature, or pressure or any other condition that is likely to vary and introduce undesired variations in the results. Further it provides means for continuously recording measurements of materials from different stages of a process or operation in such a relation to each other that the measurements appearing alongside of or overlying each other on the record will be of the same starting material at various stages in the operation or process.

As applied to the measurement of resistance in samples of liquid, the method is that of passing a current through the liquid and measuring its resistance by a bridge circuit which contains means for balancing out any abnormalities in the resistance of the fluid due to the fact that it is at a temperature other than standard. A method step and means are also provided for recording the results of a plurality of continuous series of measurements and adjusting the relation on the record, between the different series of measurements so that measurements on any particular unit of liquid at different stages of the process, will overlie or lie side by side and can conveniently be directly compared.

As may be readily seen, by a method and apparatus such as here proposed it is possible to reduce the measurements made to a common basis and at the same time properly distribute them relative to one another so that changes in the starting material will be readily distinguishable from changes in the functioning of the operation or process or the entrance of additional materials in the course of the operation or process.

Particularly, it is the intention that this invention be applied to the drilling of oil wells and used to determine the changes effected in the properties of the drilling mud between the time it passes into and the time it leaves the well. In the first place, it is intended that the determinations made on the ingoing and the outcoming mud be both reduced to the same temperature base so that direct comparison can be made. Secondly, it is intended that the records of the determinations be so adjusted that any change in the characteristics of the mud entering the well will appear exactly opposite the corresponding change caused thereby in the same mud as it leaves the well and thus permit this type of change to be immediately located and discarded. Changes in the characteristics of the fluid due to additional liquid or solid matter picked up in the well will appear only in the record of the outgoing mud and for that reason will be known to be significant.

In the case of resistivity, the indications will be of the presence of salt water or oil in the well, and when accurate enough will yield even more detailed information as to changes in the chemical composition of the strata through which the drill bit is progressing. In the case of a determination of viscosity, which can also be determined by this method, the indications will relate more to the matter of whether or not a fluid is entering the well, or whether any of the material that is being loosened by the drill is of such a nature as will tend to increase the viscosity. Viscosity or resistivity measurements can also be made in connection with other industrial processes such as the treatment of oils, sugar solutions, artificial silk spinning baths, and the like.

Measurements of viscosity may also be made electrically, for example, by revolving discs or paddle wheels in the liquid to be tested by the use of an electric motor and measuring the electrical impedance of the driving motor. In this case as in the case of resistance measurements, or in any similar case, the electrical resistance or electrical impedance is measured by a bridge circuit in which there is an element exposed to the condition, such as temperature, for which it is desired to correct and arranged to balance the difference caused in the primary circuit by the difference between the existing condition and a selected fixed base condition.

In the case of a liquid being tested for resistance, the conductance of the liquid varies with temperature in a straight line relation, and this can be balanced by a resistor in the opposite leg of the bridge which resistor has a resistance that varies in a straight line relation to temperature. Such a resistance may well be made of platinum and is exposed to the liquid being tested at the temperature at which it is tested. Further, since the rate of change of resistance with temperature is relatively small in platinum as compared with the rate of change of the conductance with temperature of a liquid, it is necessary to increase the effect of the change of resistance in the resistor and this can be effected as will be explained by applying additional voltage in the side of the bridge containing the compensating resistor.

Having properly compensated the resistance measurements they may then be recorded continuously in correlation with a record of the quantity of fluid passing the point of testing so as to give a running log of the resistance of the liquid. In the case of a drill hole there will be one log of the ingoing mud and another log of the outgoing mud and these may be placed in side by side or overlying relation on a record paper driven by a flowmeter for the mud. At least one of the recording pens is adjustable along the quantity of flow axis of the record so that the record of the determinations made on a unit quantity of mud as it goes into the well can be adjusted to appear alongside of or overlying the determinations made on the same unit quantity of mud as it leaves the well.

A more complete understanding of the advantages of this invention and the many detailed improvements over the prior art which its preferred form embodies, may be gained by a consideration of the appended drawings and the following detailed description.

In the drawings:

Fig. 3a is a diagrammatic illustration of the wiring for one of the temperature compensated viscosity measurement systems of Fig. 3;

Figure 3:
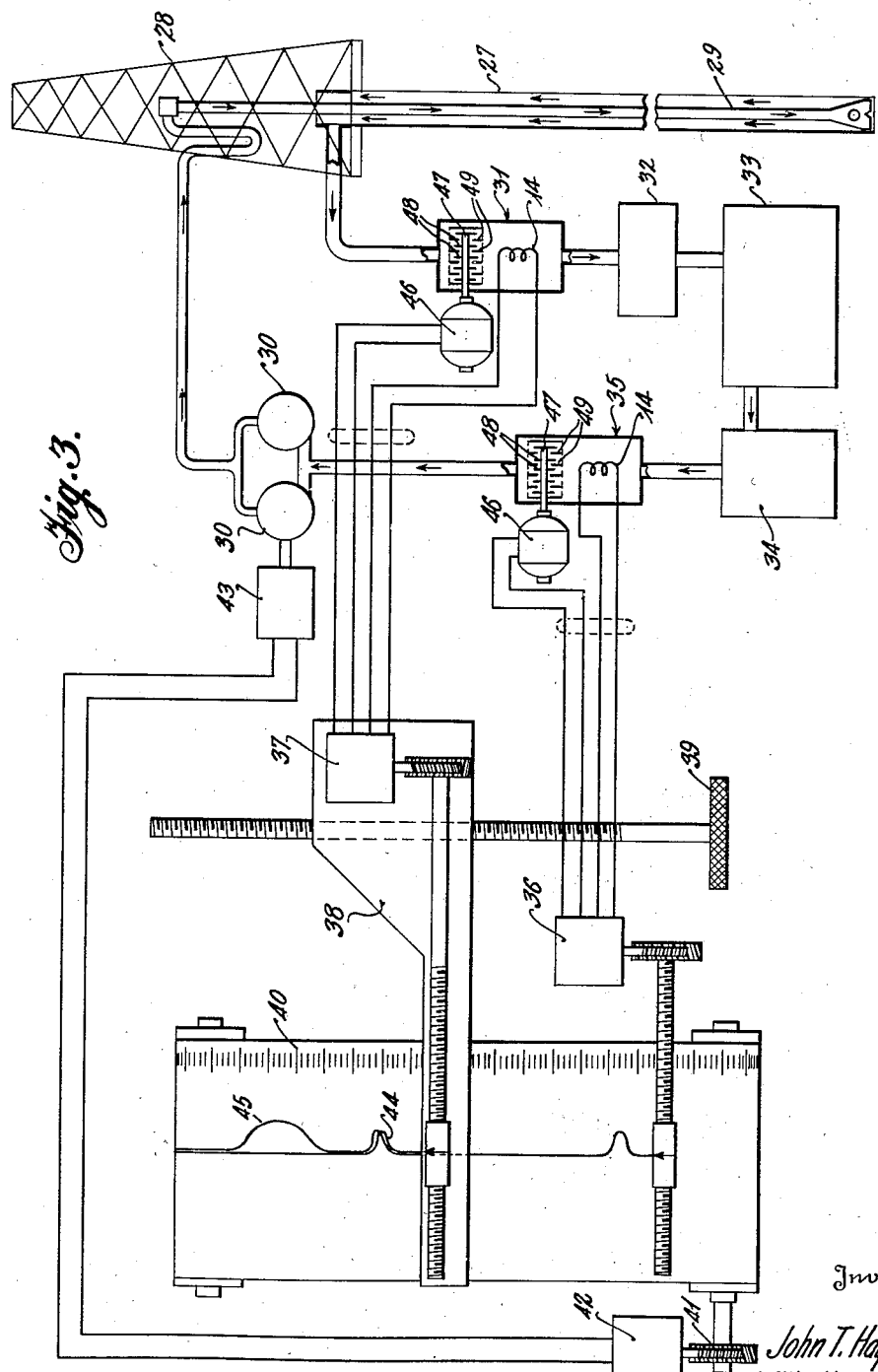
Figure 3 is a diagrammatic illustration of a system of the same type as applied to the determining and recording of the viscosity of drilling mud.
Figure 5:
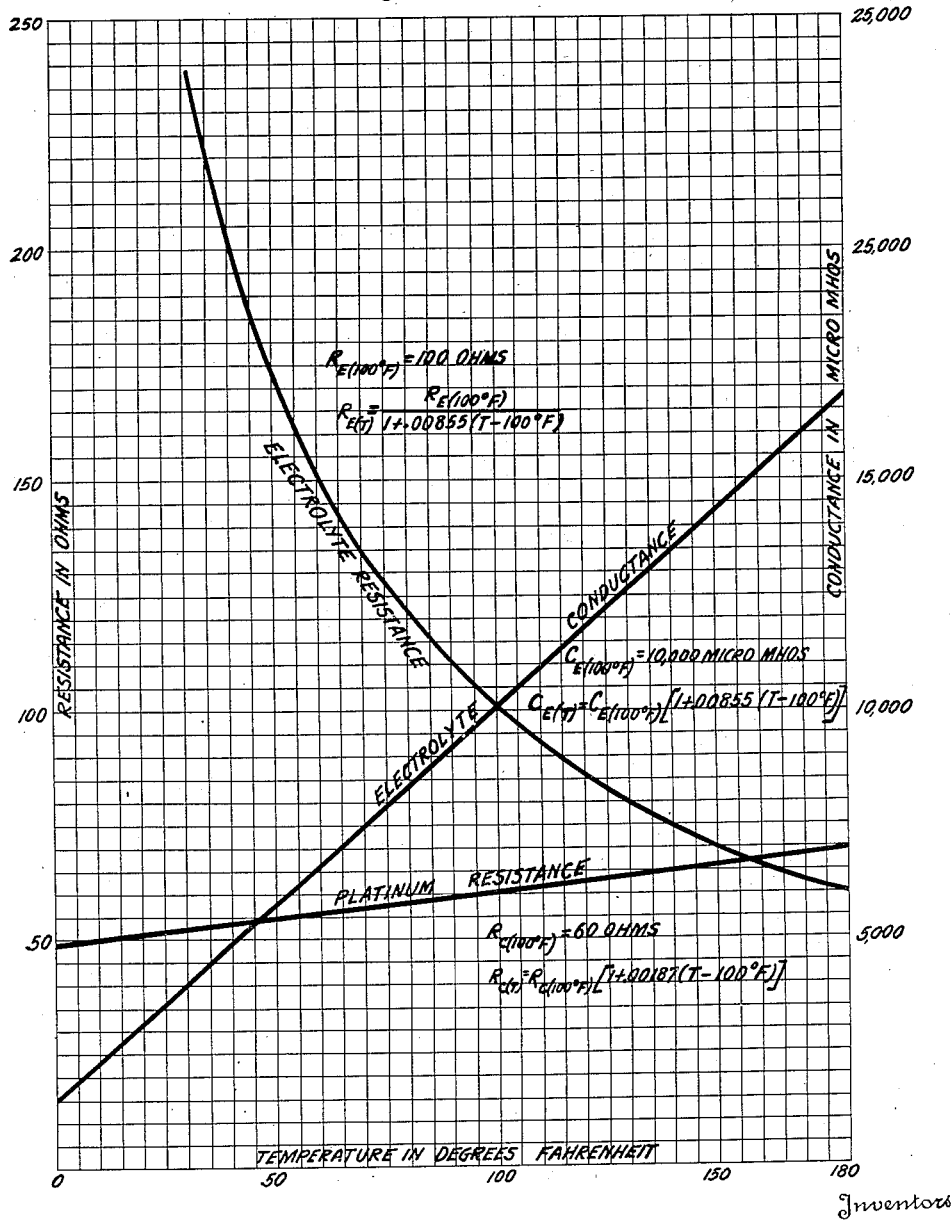

Figure 5 is a graph showing the changes in conductance and resistance in an electrolyte as compared with the change in resistance of platinum, for changes in temperature; and Figure 6 is a diagrammatic illustration of a device for measuring viscosity having a more complicated system of temperature compensation than those shown in the preceding figures, in order to compensate for changes in temperature in a liquid which is somewhat differently affected by temperature changes than those to be tested with a device of the type shown in Figure 3.

Figure 1:
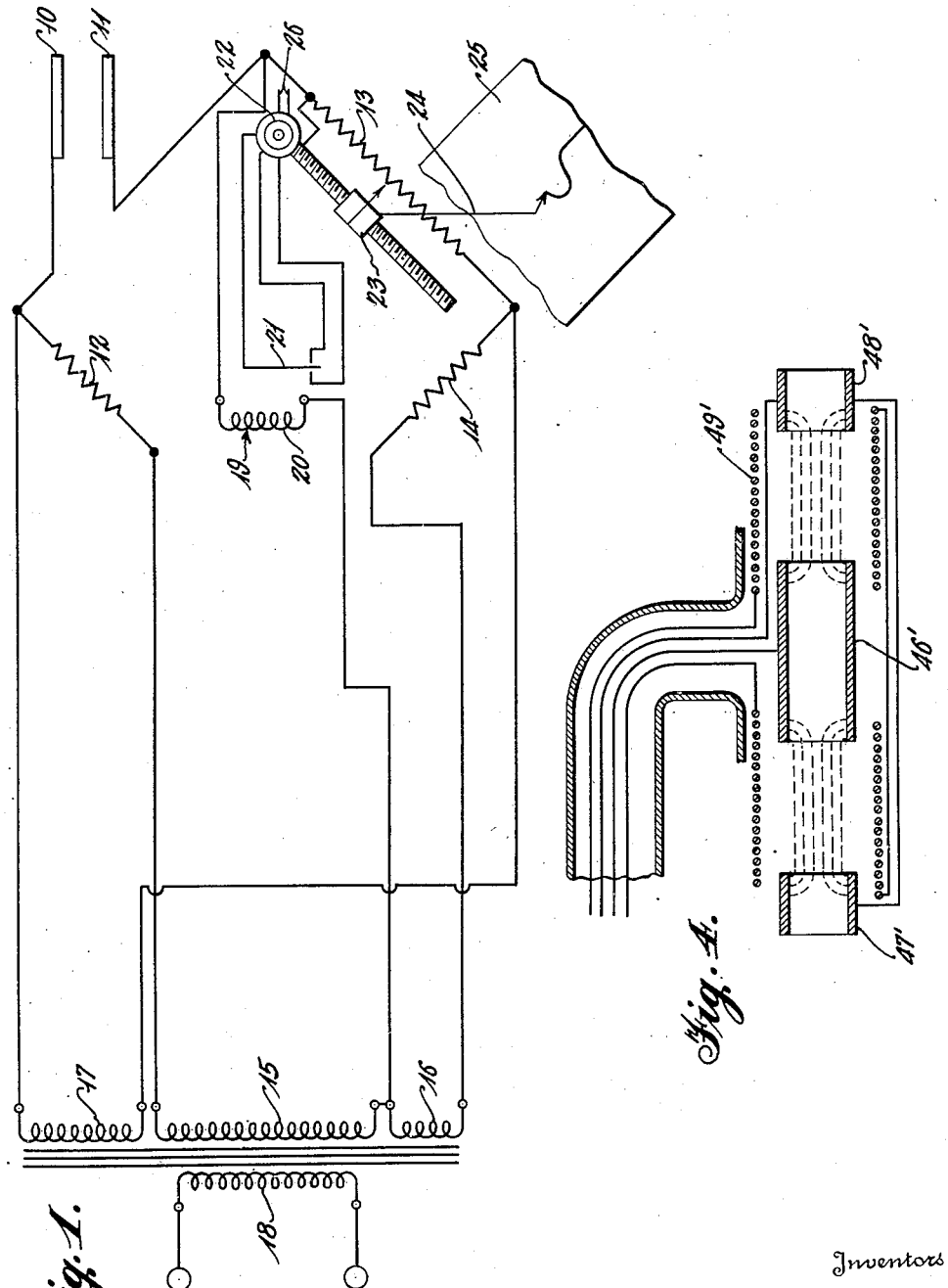
Figure 1 is a diagrammatic illustration of the essential parts of the preferred form of temperature compensation system as applied to the determination of the resistance of a fluid.

As illustrated in Figure 1, the basic essentials of an automatic device for measuring and recording the resistance of an electrolyte according to the principles of this invention consist of a pair of electrodes 10 and 11 to be immersed in the electrolyte to be tested and connected to a bridge circuit, which operates a recorder and at the same time compensates for changes in resistance of the electrolyte due to changes in temperature of the electrolyte. This bridge circuit includes a fixed resistor 12 having a negligible temperature coefficient, a variable resistor 13, also preferably having a negligible temperature coefficient and a fixed compensating resistor 14 which has a very considerable temperature coefficient and which is exposed to the electrolyte being tested so as to be constantly maintained at a temperature corresponding thereto.

The variable resistance 13 and the fixed resistance 12 form the legs of the bridge adjacent to the leg formed by the electrolyte between the electrodes 10 and 11. The compensating resistance 14 forms the leg of the bridge opposite to the electrolyte. Under these circumstances an increase in the resistance of the fixed resistance 14 tends to compensate for a decrease in the resistance of the electrolyte and hence the fixed resistance is made of a metal the resistance of which increases as the temperature increases. The resistance of the electrolyte will decrease and hence the one tends to compensate the other.

The fixed resistance 12 and the variable resistor 13 may be of any material having a low temperature coefficient. Preferably these two resistances are of manganin and the compensating resistance 14, which is to change with temperature, is of platinum.

In series with the fixed resistance 12 in its leg of the bridge is a transformer winding 15 which serves to supply an additional voltage across this resistance and in series with the compensating resistance 14 is another transformer winding 16 which serves to apply additional voltage across this arm of the bridge. The main voltage across the bridge is supplied by a third transformer winding 17 which is connected to a point between the electrolyte and the fixed resistance 12 and to a point between the variable resistance and the compensating resistance 14. Current is supplied from a source not shown to a primary 18 of the transformer which carries the aforementioned windings 15, 16 and 17 so as to energize those windings and applying the desired voltages to the bridge. By proper adjustment of these voltages the compensating effect of the compensating resistance 14 can be adjusted to exactly balance out the effect of another-than-standard temperature on the fluid being tested.

In order to make the device automatic, a relay 19 is connected across the bridge instead of the usual galvanometer. This relay consists of a coil 20 connected from a point between the electrode 11 and the variable resistance 13 to a point between the transformer windings 15 and 16 which form parts of the fixed resistor and compensating resistor arms respectively. Actuated by the coil 20 is a single pole double throw contactor switch 21 which is connected to control the action of a reversible motor 22 which in turn controls a sliding contact 23 on the variable resistance 13 and also a recording pen 24 which records the setting of the variable resistance. This setting is a measure of the resistance of the electrolyte. The record is made on a record paper 25, which may be moved by any desired means not shown in this figure. Electric current for the operation of the reversible motor 22 is supplied through leads 26 from a source not shown.

In operation the relay 19 controls the operation of the motor 22 so as to maintain the variable resistance 13 at such a value at all times that the bridge is in balance. If the fixed resistance arm and the compensator arm of the bridge at all times had fixed amounts of resistance, or fixed voltage drops across them, then the record made would be that of the resistance of the electrolyte between the electrodes 10 and 11 without any compensation being made for changes in temperature. In order for the recording to represent a corrected measurement of the resistance of the electrolyte between the electrodes, that is, a resistance corrected to a standard or base temperature, it is necessary that the difference in conductivity due to any difference in temperature be exactly compensated by a change in the resistance of the compensator arm of the bridge. It so happens that it is difficult if not impossible to use a resistance in the compensator arm with a sufficient temperature coefficient to give complete compensation but this can be achieved nevertheless by adding a source of voltage to the compensating arm, and then, to keep the bridge balanced adding a second source of voltage to the fixed arm adjacent thereto.

The effect of the application of these voltages to the arms of the bridge in addition to the main voltage across the bridge may be best understood by a mathematical analysis of the circuit as illustrated in Figure 1. Before entering into this analysis, however, it will be of assistance to consult Figure 5 and note thereon the comparative way in which the conductance and resistance of a typical electrolyte varies and the manner in which the resistance of platinum varies, all with temperature. It will be noted, for instance, that the resistance of the electrolyte does not vary in a straight line relation to the change in temperature and therefore that it would be difficult to compensate this change in resistance directly by another change in resistance. On the other hand, the electrolyte conductance does vary in substantially a straight line relation and hence it is easier, since it is possible to do so, to balance the electrolyte conductance change against a resistance change of a metal such as platinum which resistance also changes in a straight line relation to temperature. It will be noted, however, that the change in resistance of platinum is much smaller for a given temperature change than is the change in the electrolyte conductance. Therefore, it is necessary to find some way to keep these changes equal in their effect on the balance of the bridge.

It is fundamental in the bridge circuit that the two sides of the bridge, designating a side as one of the two circuits that are connected across the main source of potential, must have equal voltage drops, for these two circuits are connected together at their opposite ends and hence must be at the same potential at their ends. It is further fundamental, that when the bridge is in balance the mid points of the sides, the points between which the galvanometer, or as in the present case the balancing relay, is connected are at equal potentials. For that reason, the voltage drops in the two upper arms must be equal and the voltage drops in the two lower arms must be equal. It is not necessary, however, that the voltage drops in the upper arms be equal to the voltage drops in the lower arms. With these facts in mind the voltage drops across the various arms and sides may be computed. For this purpose the following reference characters will be assigned to the indicated quantities:

$E_F$ = voltage across the arm containing the fixed resistance 12 and the transformer winding 15.
$E_E$ = voltage across the electrolyte arm.
$C_E$ = conductance of electrolyte arm at 100° F.
$R_E$ = resistance of electrolyte arm at 100° F.
$R_C$ = resistance of compensator arm at 100° F.
$R_F$ = resistance of arm containing fixed resistance 12 and transformer winding 15.
$R_V$ = resistance of arm containing variable resistance 13.
$a$ = temperature coefficient of compensator arm in Fahrenheit referred to 100° F.
$b$ = electrolyte temperature coefficient in Fahrenheit referred to 100° F.
$E_c$ = fixed voltage applied by transformer winding 16 in series with compensator resistance 14.
$E_f$ = fixed voltage supplied by transformer winding 15 in series with fixed resistor 12.
$E_B$ = fixed voltage applied by transformer winding 17 to the bridge as a whole.
$T$ = temperature of measurement.

In order for the bridge to be in balance the voltages $E_F$ and $E_E$ must be equal. In order for the bridge to remain balanced as the temperature changes, the derivatives of these voltages $dE_F/dT$ and $dE_E/dT$ must be equal. The mathematical step to determine the conditions that must be fulfilled to make this occur are as follows:

Upper bridge arm voltages—

$$E_F = R_F \frac{E_B + E_f + E_c}{R_F + R_C[1 + a(T-100)]} - E_f$$

$$E_E = \frac{R_E}{1 + b(T-100)} \times \frac{E_B}{\frac{R_E}{1+b(T-100)} + R_V} = \frac{R_E E_B}{R_E + R_V[1 + b(T-100)]}$$

For the original balance adjust $R_V$ so that $$E_F = E_E = R_F \frac{E_B + E_f + E_c}{R_F + R_C[1 + a(T-100)]} - E_f = \frac{R_E E_B}{R_E + R_V[1 + b(T-100)]}$$

Rates of change of upper bridge arm voltages with temperature—

$$\frac{dE_F}{dT} = \frac{-aR_C R_F(E_B + E_f + E_c)}{\{R_F + R_C[1 + a(T-100)]\}^2}$$

$$\frac{dE_E}{dT} = \frac{-R_E b R_V E_B}{\{R_E + R_V[1 + b(T-100)]\}^2}$$

For balance to persist through change of temperature—

$$\frac{dE_F}{dT} = \frac{dE_E}{dT}$$

Equating and re-arranging terms—

$$\frac{R_C}{R_E}\frac{R_F}{R_V} = \frac{b}{a}\frac{E_B}{E_B+E_f+E_c}\left(\frac{R_F+R_C[1+a(T-100)]}{R_E+R_V[1+b(T-100)]}\right)^2$$

Multiply by $R_V{}^2/R_C{}^2$ $$\frac{R_F}{R_C}\frac{R_V}{R_E} = \frac{b}{a}\frac{E_B}{E_B+E_f+E_c}\left(\frac{\frac{R_F}{R_C}+1+a(T-100)}{\frac{R_E}{R_V}+1+b(T-100)}\right)^2$$

Inspection of the final equation reveals that when bridge arm resistance ratios are used that would balance the bridge in the absence of series voltages, as represented by the left hand side of the equation being unity for any bridge ratio, and also when the ratio of fixed voltages is inverse to the ratio of coefficients as shown by the first two fractions at the right hand side of the equation, then the balance persists in spite of temperature variation, except for the second order effect shown in the squared term. Further examination shows that for a unity ratio bridge the error is negligible when the temperature departure is small, but when the departure times the coefficient becomes considerable compared to 2, the error is considerable. By changing the bridge ratio to 10 the departure can be 5.5 times as great for the same error, that is, the departure times the coefficient must become considerable as compared to 11. If a bridge ratio of 10 is used for the resistances in the differential equation it is necessary to restrict the original balance equations to a ratio of 10 between the upper and lower arms. This requires that $E_f$ and $E_c$ be also in the ratio of 10:1. It is preferred in the present device to use a bridge having a 10 to 1 ratio, that is a fixed resistor 12 having about 10 times the resistance of the compensating resistor 14 and the transformer winding 15 in series with the fixed resistor 12 having a voltage about 10 times that of the transformer winding 16 which is in series with the compensating resistor 14. Values that have been found satisfactory for use in measuring resistance in drilling mud are 600 ohms for the resistor 12 which is preferably of manganin, 33.3 volts for the transformer winding 15 in series therewith; 60 ohms for the compensator resistor 14 which is preferably of platinum and 3.33 volts for the transformer winding 16 in series therewith. It has also been found satisfactory to construct the secondary 17 of the transformer so as to apply eleven volts across the bridge as a whole. The foregoing resistances and voltages, however, are given only as an example of what may be used and what will constitute a satisfactory embodiment for the measurement of the resistance of drilling mud. They are not, in any sense, essential specifications that must be met in every instance.

Figure 2:
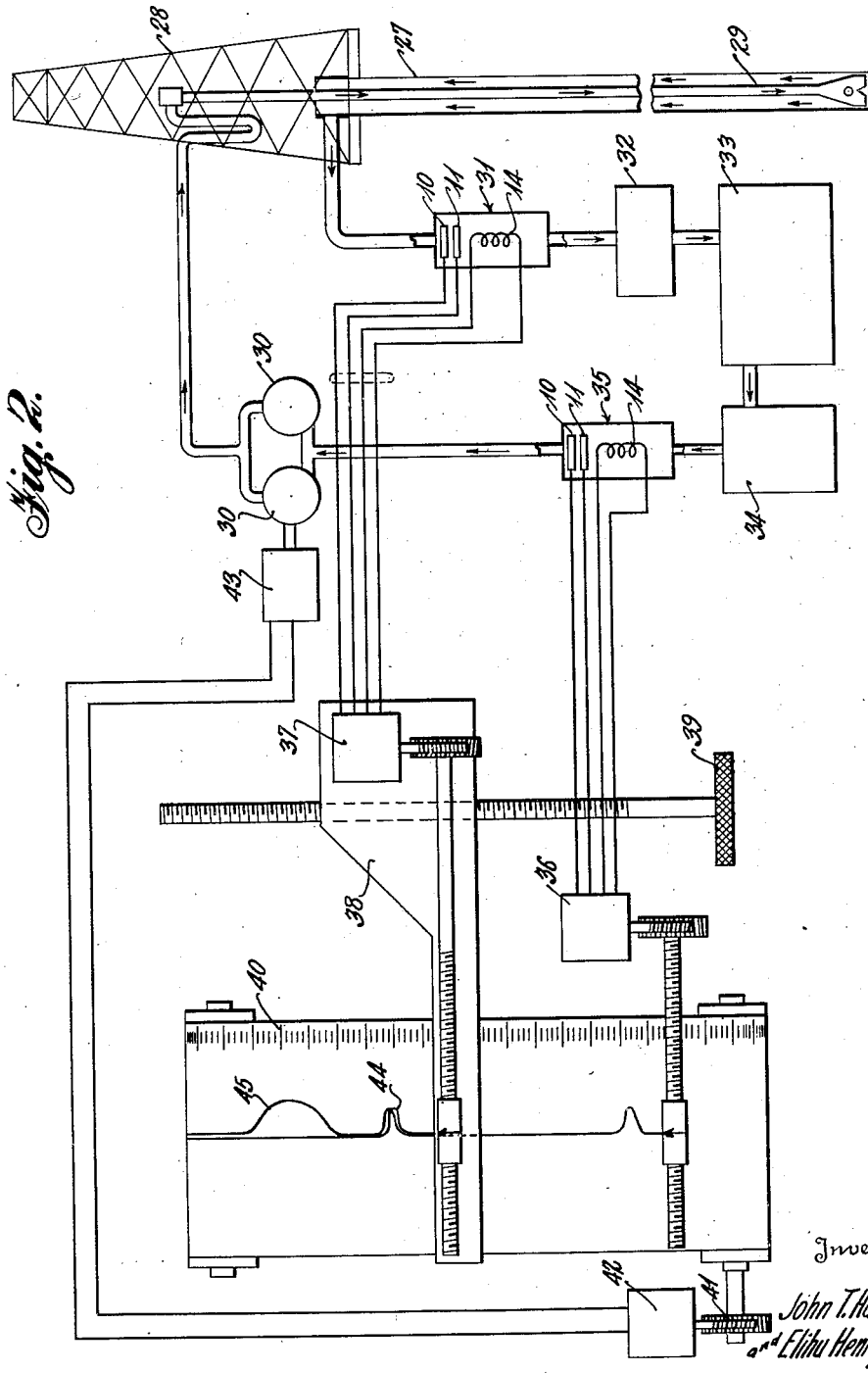
Figure 2 is a diagrammatic illustration of a more complete system, of the same type, as applied to the determining and recording of the resistance of drilling mud.

The practical use of the device in connection with the drilling of an oil well is illustrated schematically in Figure 2. As shown in this figure a well 27 is in the process of being drilled by a derrick 28 and a drill stem and bit 29. During this process, drilling mud is continuously circulated downwardly through the drill stem and bit, and upwardly outside of the drill stem. For this purpose a pair of pumps 30 are connected by suitable conduits to the head of the drill stem and the mud from the well is conveyed by suitable conduits through a testing chamber 31 and a mud conditioning chamber 32 to a settling pit 33. From this settling pit the mud is drawn off into a suction pit 34 from which it is taken to another test chamber 35 and back to the mud pumps 30 for recirculation. All this, of course, is accomplished by suitable pipe connections and all except the test chambers is conventional.

The test chambers 31 and 35 are substantially alike, differing only in that the test chamber 31 is in the return line and the test chamber 35 is in the input line. Each test chamber contains a pair of electrodes 10 and 11 like those shown in Figure 1. Each test chamber also contains a compensating resistance 14 preferably of platinum. These elements are connected by suitable electrical connections to a bridge circuit generally designated as 36 for the input mud test chamber and 37 for the return mud test chamber. These bridge circuits are in general the same as the one shown in Figure 1. However, instead of moving a recording needle directly as shown in Figure 1, each of these two circuits as arranged in Figure 2, operates the recorder needle through a pair of gears and a long screw.

One of the bridges 36 and its attendant recording mechanism is permanently located, but the other 37 is mounted on a movable arm 38 which can be adjusted by a thumb screw arrangement 39 to move it longitudinally of a record strip 40, on which the determinations made by the bridges are adapted to be recorded. This record strip is moved longitudinally under the recording pens by a gear arrangement 41 operated in accordance with the operation of the mud pumps 30, so as to make the motion of the recording paper proportional to the amount of mud being pumped. This may be accomplished either by direct gear connections or by an electromotive connection such as a Selsyn transmission system. In the drawings an electromotive transmission system is shown consisting of a motor 42 driving the gears 41 and driven in turn by a generator 43 which is connected mechanically to the mud pumps.

In operation the thumb screw adjustment 39 is set so that the record made by the measurements of the output mud is so spaced as regards the record made by the measurement for the input mud, that when a quantity of mud passes through the test chamber going into the well a record of its characteristics will be made and that when the same body of mud leaves the well another record of its characteristics will be made, either directly overlying the first record, or laterally but not longitudinally spaced therefrom on the record.

Under these circumstances when both record curves are found making a movement at the same place as at 44 on the record strip in Figure 2 then it is immediately apparent that the movement has been caused by a variation in the input mud and not by anything that has happened to the mud in the drilling operation. On the other hand, if a movement is found in the output mud curve only, as at 45, then it is apparent at once that the variation is not caused by anything in the input mud but only by something that happened in the well, for example, the encountering of oil or salt or water.

The same principles may be applied as shown in Figure 3 and Fig. 3a to the measurement of viscosity. In this case the electrodes 10 and 11 are replaced by a motor 46 which drives a shaft 47 carrying a series of discs 48 which revolve between fixed baffles 49, in the mud. The electrical impedance of the motor is measured in the same way as is mud resistance but the results show a different type of variation in the strata being drilled. If desired both measurements may be made on the mud used in a single well.

Figure 4:
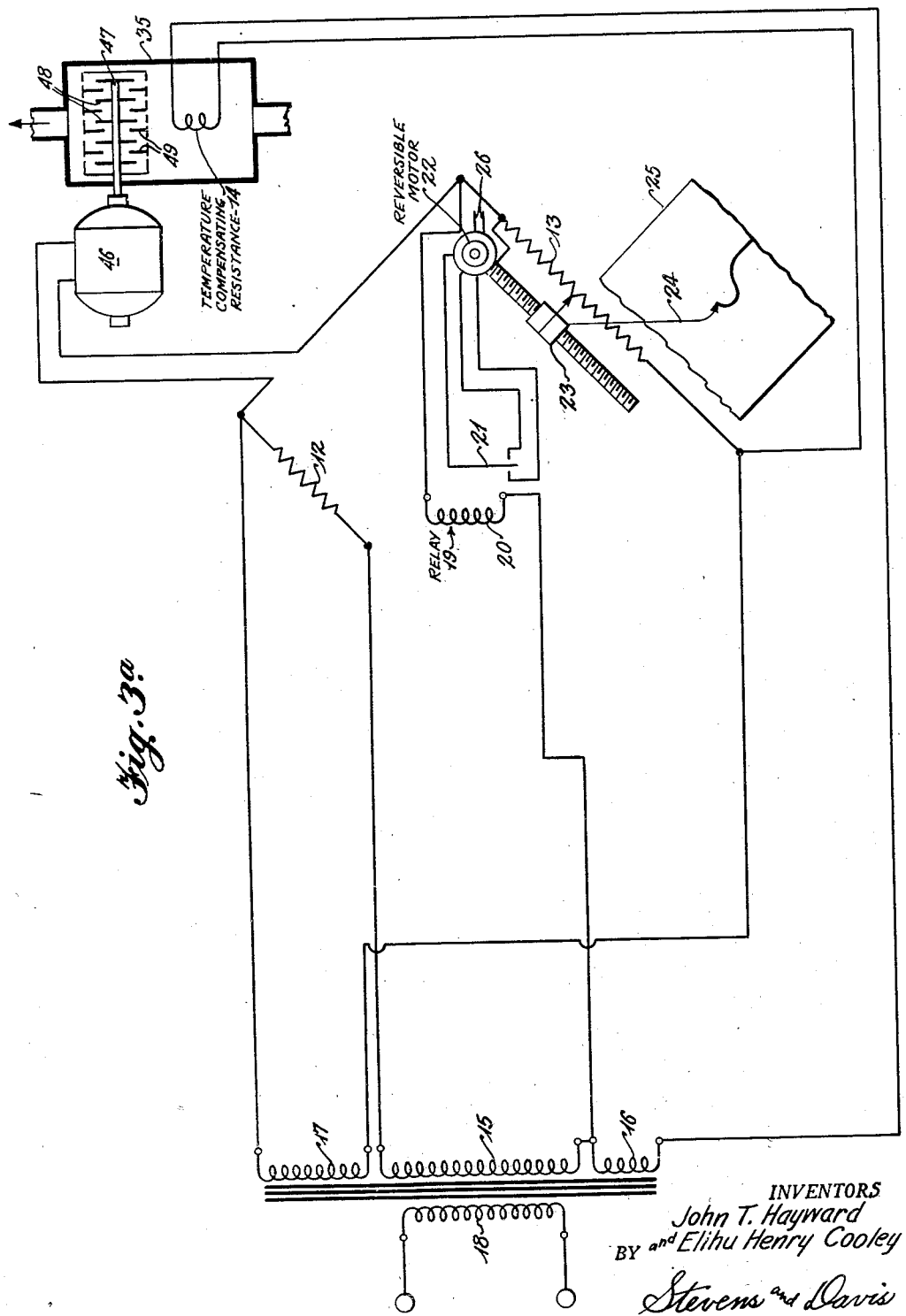
Figure 4 illustrates the construction of one of the sets of electrodes used in the resistance determination, also, diagrammatically.

In Figure 4 is shown a type of electrode or testing chamber that has been found satisfactory for the measurement of resistance in drilling mud. As shown in this figure the chamber may contain three axially aligned cylindrical electrodes the center one of which 46' is used as one of the electrodes and the outer two of which 47' and 48' are connected together to form the second electrode. A coil of wire 49' is positioned around the electrodes and acts as the temperature compensation coil. This coil is preferably of platinum. The mud is caused to flow through the chamber in a direction axial to the electrodes and the determinations may be made continuously during its flow.

Many modifications of the construction of the various elements of the apparatus described may be made within the scope of this invention. As an example of these changes reference may be had to Figure 6 which shows diagrammatically a variation of the compensating bridge. According to Figure 6, viscosity is to be measured by the use of a motor driving rotating discs in the fluid in the manner already described. The electrical impedance of the motor is measured and recorded through a bridge circuit as before. However, the basic or recording bridge circuit is supplemented by a second or compensating bridge circuit in which is located the compensating resistor. Thus, there is a measuring bridge circuit 50 and a compensating bridge circuit 51. Power is supplied to both bridges by a transformer 64. In the measuring bridge circuit one side is formed by the motor 52 which drives the viscosity determining discs and a variable resistance 53 which is varied by a reversible motor 54 which drives a screw 55 carrying a contact 56 which functions to short circuit a portion of the resistor which varies depending upon the setting of the contact. The screw 55 also carries a recording pen 57 which makes a record on a record strip 58.

The other side of the measuring bridge consists of a fixed resistance 60, and a variable resistance 59 which is varied by a reversible motor 69 which drives a screw or cylindrical cam 62 carrying a contact 61 which functions to short circuit a portion of the resistor which varies depending on the setting of the contact. A relay 63 of the type already described in connection with other figures is connected across the measuring bridge and serves to control the operation of the reversible motor 54, so as to keep the bridge continuously in balance.

Except for variations in resistance of the resistor 59, the bridge, as thus far described, would function to measure viscosity without any compensation whatsoever for temperature. As can readily be seen the side of the bridge opposite to the measuring motor 52 and the variable resistance 53 contains only fixed resistances and hence the variable resistance 53 would at all times be adjusted to balance the electrical impedance of the motor 52 and the record would be directly of the electrical impedance of this motor.

The compensating bridge is comprised on one side of a compensating resistance 65 such as has been previously described and which is immersed in the liquid being tested. This comprises one leg of its side; the other leg of the same side is comprised of a variable resistance 66 which is varied by the movement of a slider 67 mounted on a screw 68 and driven by the reversible motor 69, which also drives the screw or cylindrical cam 62 supporting the slider 61 on the variable resistor 59 of the measuring bridge. The two bridge circuits are electrically independent and the screws 62 and 68 are insulated from one another. The contactor 67 thus operates by short circuiting a portion of the variable resistance 66 and reducing the amount of the resistance in the bridge circuit.

The mechanical coupling between the positions of the contactors 67 and 61 is arranged by shaping of the cam driving surface 62 or by selection of a screw pitch so as to make a correction of the resistance in operation in resistor 59 to correspond to the temperature balance obtaining on resistor 66. The cam shape will be determined by known laws of the relation between viscosity and temperature for the material being tested. The other side of the compensating bridge consists of two fixed resistors 70 and 71. A relay 72 similar to those already described is connected across the compensating bridge and controls the reversible motor 69 to keep the bridges in balance. As the temperature of the compensating resistor 65 changes with the temperature of the fluids being tested, the setting of the contact 67 and therefore of the contact 61 will be changed and this change in position of contact 61 and corresponding resistance 59 will compensate the measuring bridge for change in temperature of the measured fluid. Obviously the threads on screws 62 and 68 can be of different pitches or one may be gear driven or cam driven from the other so as to compensate for a variation regardless of the manner in which it varies.

We claim:

1. An apparatus for continuously determining and recording a property of a substance passing through a process or operation, at a plurality of stages in the operation or process, that comprises means for determining the property at each of said stages in terms of electrical impedance, a bridge circuit for each determining means having said electrical impedance as one of its arms, means to supply electrical power to said bridge circuit, means to automatically vary the impedance of another arm of said bridge circuit to balance it and means to record the variation in the impedance for each determining device, all upon a single record strip, means affected by any variation from a standard condition of the substance being tested, at each stage where it is being tested, said means being connected to affect the balance of the bridge for the recording means of that stage so as to compensate for any variation from the standard condition of the substance being tested, and means for shifting at least one recording device relative to the others so that all determinations on the same portion of the substance being tested will be placed alongside of each other or overlying each other on the record strip, despite the fact that the measurements are made at spaced time intervals as the portion of the substance passes through the operation or process.

2. An apparatus for continuously determining and recording the resistance of a substance passing through a process or operation, at a plurality of stages in the operation or process, that comprises a pair of electrodes in contact with the substance at each of the stages, a bridge circuit for each of the stages having the pair of electrodes for that stage connected as one of its arms, means to supply electrical power to said bridge circuit, means to automatically vary the resistance of another arm of said bridge circuit to balance it and means to record the variations in the resistance for each stage, all upon a single record strip, means affected by any variation from a standard temperature of the substance being tested at each stage where it is being tested, said means being connected to affect the balance of the bridge for the recording means at that stage so as to compensate for any variations from a standard temperature of the substance being tested, and means for shifting at least one recording device relative to the others so that all determinations on the same portion of the substance being tested will be placed alongside of each other or overlying each other on the record strip, despite the fact that the measurements are made at spaced time intervals as the portion of the substance passes through the operation or process.

3. An apparatus for measuring the viscosity of a fluid that comprises in a Wheatstone bridge circuit, a first arm which includes the winding of a motor which carries means to forcibly move an element through the fluid, the electrical impedance of the motor winding being thereby varied by a change in the viscosity of the fluid, a second arm in series with the first arm and including a variable resistance whereby the bridge circuit may be brought into balance, a third arm opposite from the first arm and including an impedance element, the impedance of which varies in reverse relationship to the response of said motor winding to the change in viscosity of the fluid, said impedance element being contiguous to the element of the motor to move through the fluid, a fourth arm in series with said third arm and including a resistance, means to apply a potential so that the first and second arms are in shunt relationship with the third and fourth arms, and means to ascertain the state of balance of the bridge with respect to a point between the first and second arms and a point between the third and fourth arms.

4. An apparatus for measuring viscosity of a fluid comprising, an electric motor including an element connected thereto to be driven in the fluid under test, a bridge circuit having said electric motor connected as one leg thereof, a variable resistance constituting a second leg, a fixed resistance constituting a third leg, and a temperature variable resistance constituting the fourth leg of the bridge and immersed in the fluid to be tested contiguous to said element of the motor disposed in the fluid, means for varying said variable resistance in accordance with variations in the impedance of said electric motor, means for applying electrical potential across the bridge, and means for manifesting the state of balance of the bridge.

JOHN T. HAYWARD.
ELIHU HENRY COOLEY.